(12) United States Patent
Pepper

(10) Patent No.: US 11,953,776 B2
(45) Date of Patent: Apr. 9, 2024

(54) PROGRAMMABLE PULSE SHAPER USING A VIPA-GRATING PAIR INTEGRATED WITH A SPATIAL LIGHT MODULATOR AND A RETRO-ARRAY PHASE-CONJUGATE MIRROR

(71) Applicant: David M. Pepper, Camarillo, CA (US)

(72) Inventor: David M. Pepper, Camarillo, CA (US)

(73) Assignee: David M. Pepper, Camarillo, CA (US)

( * ) Notice: Subject to any disclaimer, the term of this patent is extended or adjusted under 35 U.S.C. 154(b) by 160 days.

(21) Appl. No.: 17/585,444

(22) Filed: Jan. 26, 2022

(65) Prior Publication Data

US 2023/0236455 A1     Jul. 27, 2023

(51) Int. Cl.
*G02F 1/1335* (2006.01)
*G02B 27/10* (2006.01)

(52) U.S. Cl.
CPC .... *G02F 1/133528* (2013.01); *G02B 27/1006* (2013.01); *G02F 2203/01* (2013.01); *G02F 2203/50* (2013.01)

(58) Field of Classification Search
CPC .......... G03H 2225/60; G03H 2225/34; G02B 27/1006; G02B 26/06; G02F 2203/50; G02F 2203/01
See application file for complete search history.

(56) References Cited

U.S. PATENT DOCUMENTS

| 5,682,262 | A  | 10/1997 | Wefers et al. |
| 9,318,863 | B2 | 4/2016  | Riedel et al. |

| 2004/0004746 | A1* | 1/2004  | Riza  | G02B 26/106 |
|              |     |         |       | 359/204.1   |
| 2005/0270616 | A1* | 12/2005 | Weiner | G02F 1/13471 |
|              |     |         |       | 359/246      |
| 2008/0089698 | A1* | 4/2008  | Jiang  | H04B 10/505 |
|              |     |         |       | 398/189      |

(Continued)

OTHER PUBLICATIONS

U.S. Appl. No. 17/643,348, filed Dec. 8, 2021, Pepper.

(Continued)

*Primary Examiner* — Jonathan Y Jung

(57) ABSTRACT

A diffraction-limited, programmable pulse shaping network using a virtually integrated phased array (VIPA)-grating pair, integrated with a 2-d transmissive phase-only spatial light modulator (SLM) and a retro-array phase-conjugate mirror (RA-PCM). A high-temporal resolution, broadband pulse shaping network is realized using a 2-D VIPA-grating dispersive element pair, with a programmable SLM at a common Fourier transform plane. True wavefront reversal ("time reversal") is realized using a self-starting RA-PCM, which compensates for system path distortions, misalignment, beam wander, vibrations and optical aberrations. Upon reverse transit through the system, the RA-PCM wavefront matches the set of virtual images emerging from the VIPA. The RA-PCM is a self-starting, low-power device, without frequency shifts, doesn't require pump beams and/ or the need for high-intensity stimulated scattering threshold conditions to be met. Polarization decoupling enables the RA-PCM to compensate for optical distortions, while enabling the SLM to generate real time Fourier phase masks for programmable pulse shaping.

17 Claims, 13 Drawing Sheets

(56) References Cited

U.S. PATENT DOCUMENTS

2009/0285582 A1* 11/2009 Miao .................. H04B 10/2569
398/208
2010/0183310 A1* 7/2010 Suzuki ............... G02B 6/12033
398/81

OTHER PUBLICATIONS

U.S. Appl. No. 17/566,327, filed Dec. 30, 2021, Pepper.
Supradeepa, D. E. Leaird, and A. M. Weiner, "Programmable High Resolution Broadband Pulse Shaping using a 2-D VIPA-Grating Pulse Shaper with a Liquid Crystal on Silicon (LCOS) Spatial Light Modulator," in International Conference on Ultrafast Phenomena, OSA Technical Digest (CD) (Optica Publishing Group, 2010), paper TuF3.
Weiner, "Ultrafast optical pulse shaping: A tutorial review," Opt. Comm., vol. 284, pp. 3669-3692, 2011.

* cited by examiner

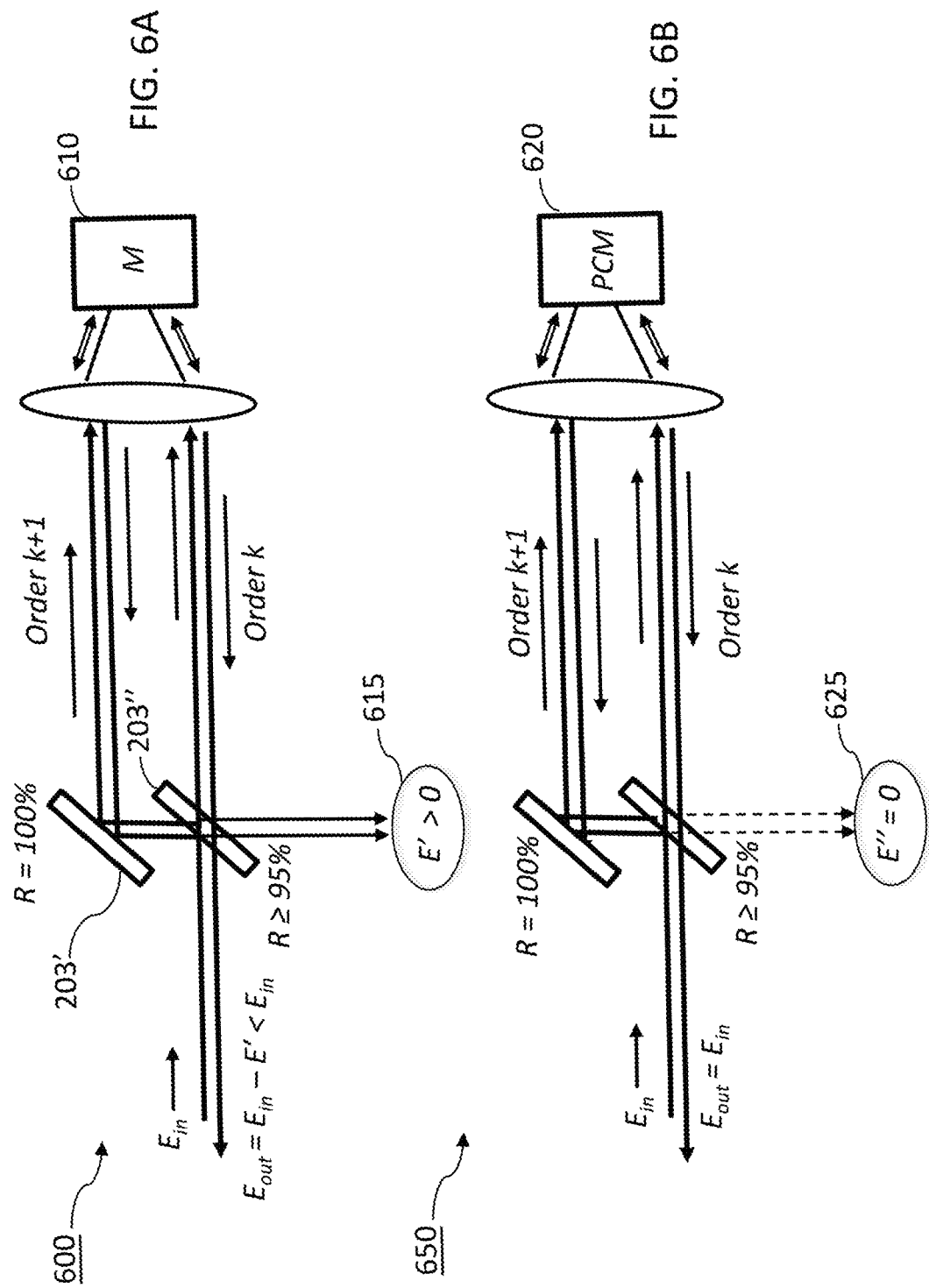

PROGRAMMABLE PULSE SHAPER USING A VIPA-GRATING PAIR INTEGRATED WITH A SPATIAL LIGHT MODULATOR AND A RETRO-ARRAY PHASE-CONJUGATE MIRROR

FIELD OF THE INVENTION

The present disclosure relates to programmable optical short-pulse shaping networks with applications ranging from optical communications, spectroscopy, rf photonics and materials processing to the control of quantum processes. More specifically, it relates to the use of virtually imaged phased array (VIPA) elements, integrated with gratings, Fourier transform optics, programmable spatial light modulators and retro-array phase conjugate mirrors, the latter resulting in a diffraction-limited system, with wavefront matching, and compensation of static and dynamic path aberrations, optical distortions, misalignment, beam wander, and vibrations.

DESCRIPTION OF RELATED ART

The related art pertains to optical pulse shaping networks, dispersive elements such as virtually integrated phased array (VIPA) devices, combined with diffraction gratings and spatial light modulators, the latter for pulse shaping programmability. The related art also pertains to self-starting phase-conjugate mirrors using retroreflector arrays. This art may be of interest to the reader when reviewing this description of the present technology.

Femtosecond pulse shaping is widely used in myriad applications, ranging from optical communication, rf photonics, processing of materials, and high precision frequency metrology to nonlinear microscopy, spectroscopy and coherent control of quantum systems. Turning now to FIG. 1A, a basic pulse shaping technique 100 is shown that involves the use of a pair of gratings, a 1-d amplitude or phase transmission mask, and a pair of Fourier transform lenses positioned in a so-called "4-f" configuration, where f is the focal length of the lenses. A collimated input pulse 101 is incident upon a dispersive element such as a diffraction grating 102. The grating disperses the various optical wavelengths that comprise the pulse, transforming the temporal domain of the pulse into the spectral/spatial domain. A lens 103 placed at a distance of its focal length, f, from the grating collimates the input spectrum (i.e., performs a Fourier transform of the input optical spectrum beam spot). A 1-d modulator array, or mask 104, is placed at the back focal plane of the lens 103 (which corresponds to the spatial transform of the input beam on the grating). The mask can be a fixed 1-d (i.e., line, or linear) amplitude or phase pattern or a 1-d spatial light modulator, the latter enabling the mask to be programmed. The mask imposes amplitude and/or phase information onto each resolvable spectral component of the incident pulse. A second lens 105, placed one focal length beyond the mask performs the operation of a Fourier transform of the now-programmed pulsed spectral components of the beam, with its transform output incident upon a second grating 106 at the back focal plane of the lens 105, in the form of a focused spot. This grating restores the spatial (spectral) pattern back into the time domain. The resultant output is in the form of a programmable pulse waveform 107.

A double-pass reflective mode of the pulse shaper can be realized by placing a mirror directly beyond the modulator mask to achieve the same output waveform. FIG. 1B shows this modality 130, wherein, a single dispersive element, in this case, a grating 102, and a single lens 103 are utilized. A collimated input pulse 101, is dispersed by the grating 102, and collimated by lens 103 (i.e., Fourier transformed), where the grating is placed at the front focal plane of the lens 103. The beam is then incident upon the modulator mask 104, placed at the back focal plane of lens 103. A mirror 108 placed directly behind mask 104 reflects the beam, retracing its incident path, propagating back through the lens 103 and diffracting from the grating 102, resulting in a programmable output waveform 107. The present disclosure utilizes this basic reflective mode of operation.

This idealization assumes perfect (ideal) optical components throughout the system, including relay optics, the grating and the mask. That is, all optical elements are assumed to be free of imperfections. Yet another assumption is that all optical components are in perfect alignment, without deviation. In reality, optical elements are not perfectly flat, spherical or configured. In addition, masks (be they fixed or programmable) do not possess perfect optical quality. Moreover, real world systems are not perfectly aligned or maintain alignment, and are subject to vibrations, misalignment, relative platform motion and beam wander. Such problematic issues can result in output distorted optical waveforms that deviate from that predicted by theory, and, hence, lack the temporal response based on fundamental assumptions. In addition, the systems are not diffraction-limited. In the latter case, the wavefronts of the incident and processed wavefronts do not necessarily match as the beam diffracts through the system.

What is needed is a means by which to compensate for imperfect optical elements, including the fixed or programmable masks, as well as static or dynamic optical aberrations such as vibrations, misalignment, beam wander. What is further needed is an optical device or devices that can result in diffraction-limited performance so that the output waveform best replicates what is theoretically expected. The present disclosure overcomes such real-world drawbacks and results in a near-diffraction-limited pulse shaping network.

Turning now to FIG. 1C, another example of the prior art is shown 150. In this example, a double-pass configuration is depicted, as in FIG. 1B. This configuration employs a pair of 1-d gratings (one grating is used in place of the lens of the previous case). An input beam 31, comprised of a short pulse 1, is incident upon the system. One grating 11 disperses (2) the incident spectral beam 3 and the second grating 12 collimates the light, which is incident upon a 1-d mask 20, placed at a Fourier transform plane 5. The mask can be programmable 40, using a 1-d spatial light modulator, SLM 20. The SLM employs a LC layer for programmability, followed by a mirror 13 to reflect the processed light back 4 through the pair of gratings (11 and 12), mirror (M1) and beam splitter (M2), resulting in a programmed output waveform 7 as the system output beam 6.

As before, aberrations in the gratings, mirrors and/or optical misfigures in the SLM can distort the output waveform relative to that expected from theory. Optical misalignment, vibrations, beam wander and path aberrations can also degrade system performance. Owing to diffraction, the backward-going beam may not match the wavefronts of the incoming beam.

What is needed is a means by which such static and dynamic errors can be compensated in real time. The present disclosure addresses these shortcomings, resulting in a diffraction-limited system, free of distortions and dynamic motion errors, to realize the maximum temporal resolution of the output waveform, limited by the fundamental considerations, such as the resolution of the dispersive element and the diffraction limit.

Turning now to FIG. 2A, an alternate dispersive element is shown 200, referred to as a "virtual imaging phased array" (VIPA) in the known art. The VIPA 203 can replace the grating(s) or prism(s) in the above-mentioned system. The VIPA has been shown to disperse an input beam into a spectrum by a factor of 10 to 20 times greater than that of a prism or grating, resulting in a programmable waveform with potentially 10 to 20 times greater spectral (temporal) resolution.

As shown in FIG. 2A, a fiber-collimated input beam 201 is incident upon a cylindrical lens 202, producing a line focus (instead of a point-focus as is the case with the above-mentioned 1-d gratings) which, in turn, is incident upon the VIPA element 203. The result is a series of dispersed output beams 204 (i.e., a set of wavelengths).

FIG. 2B shows a VIPA 250 in greater detail and how it functions. A collimated incident beam 201 strikes a cylindrical lens 202 resulting in a line focus incident upon the VIPA element 203, oriented at a small input angle θ (typically, several degrees). A typical VIPA is comprised of a pair of thin glass parallel plates 203' and 203", separated by a small distance, t (typically, mm or less). One plate (203') is antireflective coated at the lower region to allow the incident line-focus beam to enter the element at the entrance portion. The remainder of plate 203' is 100% reflection coated. The other plate 203" is reflective coated, with a 95% reflection coefficient along its entire length. As shown in the figure, the incident, line-focused beam zig-zags between the plates with a partial output beam upon each round trip, resulting in a set of parallel line-collimated beams 205 at the output, called "orders." Each beam (order) is dispersed in wavelength according to FIG. 2A. One can view this device as a Fabry-Perot cavity with a tilted input beam, whose output beams are parallel and spatially separated. The free spectral range (FSR) is inversely proportional to the round trip cavity time, as in a Fabry-Perot cavity (typically, a few 100 GHz).

The various orders emanate from a set of virtual images 206, which overlap and interfere with each other, forming a coherent composite output collimated two-dimensional (2-d) beam. The result is that the VIPA emulates a blazed diffraction grating with a dispersion 10 to 20 times greater than that of a typical grating.

FIG. 3 shows data taken on a typical VIPA element as a function of angle and wavelength. The dispersion, or slope (angle vs. wavelength), of the various orders is shown, which is many times greater than that of a typical grating.

Turning now to FIG. 4, a 2-d pulse shaper in the prior art is shown 400, which utilizes a combination of a VIPA and an orthogonally configured diffraction grating (typically, 940 lines/mm) forming a two-dimensional (2-d) dispersive pair, in a folded pulse shaper configuration (recall FIG. 1B, which is a folded 1-d analog). The goal of this system is to provide a programmable output waveform of greater temporal resolution relative to the one-dimensional systems shown in FIGS. 1A, 1B and 1C.

In this system 400, a short-pulsed laser 401 provides a collimated beam that is incident upon a circulator 402, whose output beam strikes a cylindrical lens 403. The circulator 402 passes the input beam and out-couples the reverse-propagating beam, as is known in the art. The forward-going, collimated beam strikes the cylindrical lens 403, resulting in a line focus. The line-focused beam is incident upon a VIPA 203, arranged in series with a diffraction grating 405, the latter of which disperses the beams in an orthogonal direction relative to that of the VIPA. The VIPA disperses the incident light into a pattern of line-focused beams (orders), whereas the diffraction grating disperses the line-focused beam array, forming a two-dimensional mapping of the input beam into a spatial/spectral space.

A pair of crossed cylindrical lenses 406 and 407 have their respective input focal planes (input transform planes) coincident with the VIPA and the diffraction grating. The respective back focal planes (output transform planes) are coincident at the plane of a mask, 410, which, in this case, is a 2-d Amplitude Reflective Spatial Light Modulator (A-R-SLM). Mirror 408 directs a featureless beam ($E=A_1=1$) to the A-R-SLM. The SLM (a 2-d liquid crystal layer on a silicon device) modifies the polarization of the 2-d beam on a pixel-by-pixel basis, with an internal mirror to reflect the now-programmed beam, as is known in the art. This SLM, in conjunction with a linear polarizer oriented at 45° 409, results in a 2-d effective programmable amplitude mask $[E_{out}=A(x,y)$, where $A(x,y)$ is the amplitude], which is controlled by controller 440. Upon reflection from the A-R-SLM, the now-programmed beam retraces its incident path in a reverse sequence, back through the polarizer, lenses, the grating and the VIPA. The circulator out-couples the beam, resulting the desired programmed waveform 411, revealing the now-programmed waveform in the time domain. Thus, a folded, high-spectral resolution, pulse-shaping network is realized.

A typical experimental result using the system 400 of FIG. 4 is shown in FIG. 5. FIG. 5(a) shows the spectrum of the input pulse, which is essentially featureless, as this is the spectrum of a short, transform-limited input pulse from a 50 MHz, 150 femtosecond fiber laser. FIG. 5(b) shows the output of the pulse shaper, revealing the modified spectrum of the beam, as programmed by the SLM, typical of a programmable waveform output.

As is the case of the 1-d pulse shaper, there are several design considerations in this system that can result in an output waveform that is distorted in the time domain and deviates from that theoretically predicted. First, analogous to the 1-d grating disperser of FIG. 1, in the present case, the VIPA can result in distortions owing to the fact that the set of beams that emerge from the VIPA may not be perfectly collimated (as discussed below). Moreover, since the beams emerge from a set of virtual image beam waists (recall 206 from FIG. 2B), they suffer from diffractive effects, since the virtual images are displaced upon each reflection.

Note that this set of parallel line-focused beams is equivalent to a set of output beams from a series of parallel Mach-Zehnder interferometers. Since the beams are mutually coherent, deviations from parallelism of the VIPA plates 203' and 203", and/or imperfect glass plates and misalignment, can result in a set of coherent beams that emerge from the 95% reflection plate 203" in an undesirable direction from the VIPA element. That is, upon reflection of the reverse-transit beam from element 203" a composite, constructively interfered beam can emerge in a downward direction in FIG. 2B and FIG. 4, reducing the amplitude of the desired, backward-going beam.

FIG. 6A depicts a scenario to better appreciate how a VIPA, in conjunction with an ordinary mirror (such as the mirror within the A-R-SLM), can give rise to phase aberrations and deviations from ideal VIPA performance. By comparison, FIG. 6B shows how a phase conjugate mirror (PCM), that replaces the ordinary mirror (within the A-R-SLM) can provide a solution to overcoming such drawbacks.

FIG. 6A shows a pair of beams (two adjacent orders, k and k+1) that is incident upon an ordinary mirror 610 (which represents the internal mirror of the A-R-SLM of FIG. 4). This is compared against that of a PCM in the same system (which replaces the internal mirror of the A-R-SLM), in FIG. 6B.

Referring to FIG. 6A, if the VIPA beams are not mutually parallel and/or if the optical elements possess aberrations (e.g., not of sufficient optical quality) or misaligned, the reverse propagating beams can emerge from the VIPA in a (downward) direction that is not in the ideal retro-direction relative to the incident beams. In this case, constructive interference of the beams may be compromised, resulting in a secondary beam that emerges from the VIPA in an undesirable direction (downward, upon reflection from the VIPA element 203"). This is shown by the output 615 in FIG. 6A, where E'>0, and therefore, $E_{out}=E_{in}-E'<E_{in}$. Owing to possible surface distortions in the optical elements, this field can also be spatially dependent, that is, E'=A'(x,y), where A'(x,y) is the amplitude.

In addition, if there exists misalignment of the mirror 610 or other optical elements, the return beam may not precisely overlap that of the emerging beam set from the VIPA element, which can also degrade the optical interference of the reflected beams in the transverse plane. Moreover, imperfections in the A-R-SLM (deviations from parallelism, an imperfect optical quality Si wafer, SLM window aberrations, etc.) can also impose additional phase distortions imposed onto the interacting beams. Also, owing to the set of virtual images (recall 206 in FIG. 2B), diffractive effects can degrade the performance of the VIPA resulting in E'>0 (ideally, E' should equal zero), since each virtual image order is further displaced along the optical axis.

What is needed is a means by which these distortions can be compensated, in addition to beam wander, misalignment, vibrations, imperfect cylindrical lenses, imperfections in the circulator and compensation for diffractive effects due to the displaced virtual images (206 in FIG. 2B). The present disclosure provides a viable approach to circumventing these problems and design issues.

In a preferred embodiment, these deficiencies can be obviated by replacing the reflective A-R-SLM with a phase-only, transmissive SLM (ψ-T-SLM) and a unique PCM (a retro-array PCM; RA-PCM). An embodiment utilizing these modules and resulting in a programmable phase mask is described below.

To appreciate how a VIPA in conjunction with PCM can provide a solution to overcoming the above drawbacks, FIG. 6B depicts the benefit of replacing the conventional mirror 610 of FIG. 6A (600) with a phase conjugate mirror 620 in a folded, or double-pass configuration 650, as is the case in the present disclosure. The PCM, upon double-passing through the system, provides for compensation for propagation errors, imperfect optical components, beam wander, vibrations and misalignment. This results in a diffraction-limited system, without undesirable (downward; out-coupled) losses in the VIPA; that is E"=0, and, therefore, $E_{out}=E_{in}$, as shown by 625.

The presence of a PCM assures diffraction-limited beam formation within the system, as well as assuring proper alignment owing to the wavefront reversal property of the PCM. In addition, the PCM compensates for aberrations of the various optical elements, including the SLM, waveplates, lenses, Faraday rotators, etc. as well as dynamic distortions, such as vibrations or beam wander. One feature is that the VIPA functions more effectively, as the undesirable reflective output is minimized, as shown in the figure, by zero output intensity in the direction 625 (i.e., E"=0). A second feature is that the system will result in a diffraction-limited pulse shaper. That is, the reverse-propagating wavefronts will match the displaced virtual imaged wavefronts of the forward-going beamlets (recall 206 of FIG. 2B). Hence, the system will perform at a greater degree of efficacy and accuracy, resulting in a programmable waveform of greater temporal resolution, precision and efficiency.

In summary, there exists a need for a robust pulse shaping network architecture which overcomes at least some of the above-mentioned disadvantages and limitations of prior art systems and methods.

The aforementioned state-of-the-art in pulse shaping networks includes, for example, (i) U.S. Pat. No. 5,682,262, entitled "Method and device for generating spatially and temporally shaped optical waveforms," (ii) U.S. Pat. No. 9,318,863, entitled "Device and method for stretching or compressing laser pulses," (iii) U.S. patent application Ser. No. 17/643,348, entitled "Wavefront reversal device using a MEMS spatial phase modulator integrated with a retroreflector array," (iv) U.S. patent application Ser. No. 17/566,327, entitled "Spectrally and spatially distributed phase conjugate long laser resonator," (v) V. R. Suprapeeda, et al., "Programmable high resolution broadband pulse shaping using a 2-D VIPA-grating pulse shaper with a liquid crystal on silicon (LCOS) spatial light modulator," International Conference on Ultrafast Phenomena, OSA Technical Digest (CD) (Optical Society of America, 2010), paper TuF3, and (vi) A. M. Weiner, "Ultrafast optical pulse shaping: A tutorial review, Opt. Comm., vol. 284, pp. 3669-3692 (2011).

The disclosures of each of the publications mentioned in this section and in other sections of the specification are hereby incorporated by reference, each in its entirety.

SUMMARY OF THE INVENTION

It is an attempt in creating the present disclosure to realize a diffraction-limited, high-temporal resolution, broadband, programmable, robust pulse shaping network that can accommodate femtosecond pulsed optical beams.

It is a further attempt in creating the present disclosure to establish a pulse shaping network with capability to accommodate a phase-only two-dimensional spatial light modulator mask to realize desired programmable output waveforms.

It is yet a further attempt in creating the present disclosure to provide for the real-time compensation for path distortions in the pulse shaping network, as well as a means to compensate for optical aberrations in the optical elements, gratings and spatial light modulators that comprise the system.

It is a further attempt in creating the present disclosure to provide for real-time compensation for network misalignment, beam wander, vibrations, and relative platform motion that can otherwise degrade the performance of the system.

It is yet a further attempt in creating the present disclosure to integrate a phase conjugate mirror (PCM) for diffraction-limited performance into the pulse shaping network—a PCM of which does not require pump beams, that is spectrally broadband, is not polarization dependent, does not require a nonlinear threshold condition to be met, and is self-starting.

The goal of this system is four-fold: (1) to provide programmable high resolution wideband spectral shaping of short-pulsed optical beams; (2) to enable programmable pulse shaping to be realized using a phase-only programmable mask; (3) to compensate for static and dynamic optical distortions and aberrations in the system in real-time; and (4) to realize a diffraction-limited pulse shaping network for maximum temporal resolution of the programmable waveform output.

In summary, a diffraction-limited, programmable pulse shaping network is described using a virtually integrated phased array (VIPA)-grating pair, integrated with a 2-d phase-only transmissive spatial light modulator ($\psi$-T-SLM) and a retro-array, phase-conjugate mirror (RA-PCM). A high-temporal resolution, broadband pulse shaping network is realized using a 2-D VIPA-grating dispersive element pair, with a programmable $\psi$-T-SLM at a common Fourier transform plane. "True" wavefront reversal ("time reversal") and diffraction-limited performance is realized using a self-starting RA-PCM, which compensates for system path distortions, misalignment, beam wander, vibrations and optical aberrations. Upon reverse transit through the system, the RA-PCM wavefront matches the set of virtual images emerging from the VIPA. The RA-PCM is a self-starting, low-power device, without frequency shifts, and doesn't require pump beams or the need for high-intensity stimulated scattering threshold conditions to be met. Polarization decoupling enables the RA-PCM to compensate for optical distortions, while enabling the $\psi$-T-SLM to generate real time Fourier phase masks for programmable pulse shaping.

This summary is provided to introduce a series of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The accompanying drawings, which are incorporated into and form a part of the disclosure, are only illustrative embodiments of the disclosure and serve to better understand the principles of the disclosure in conjunction with this description. The figures are not necessarily drawn to scale.

FIG. 5(a) shows the measured spectrum of an input pulse, whereas FIG. 5(b) shows the measured spectrum of the pulse-shaping network output for a given amplitude mask pattern imposed onto the 2-d spatial light modulator (A-R-SLM).

DETAILED DESCRIPTION OF THE INVENTION

Figure 7:
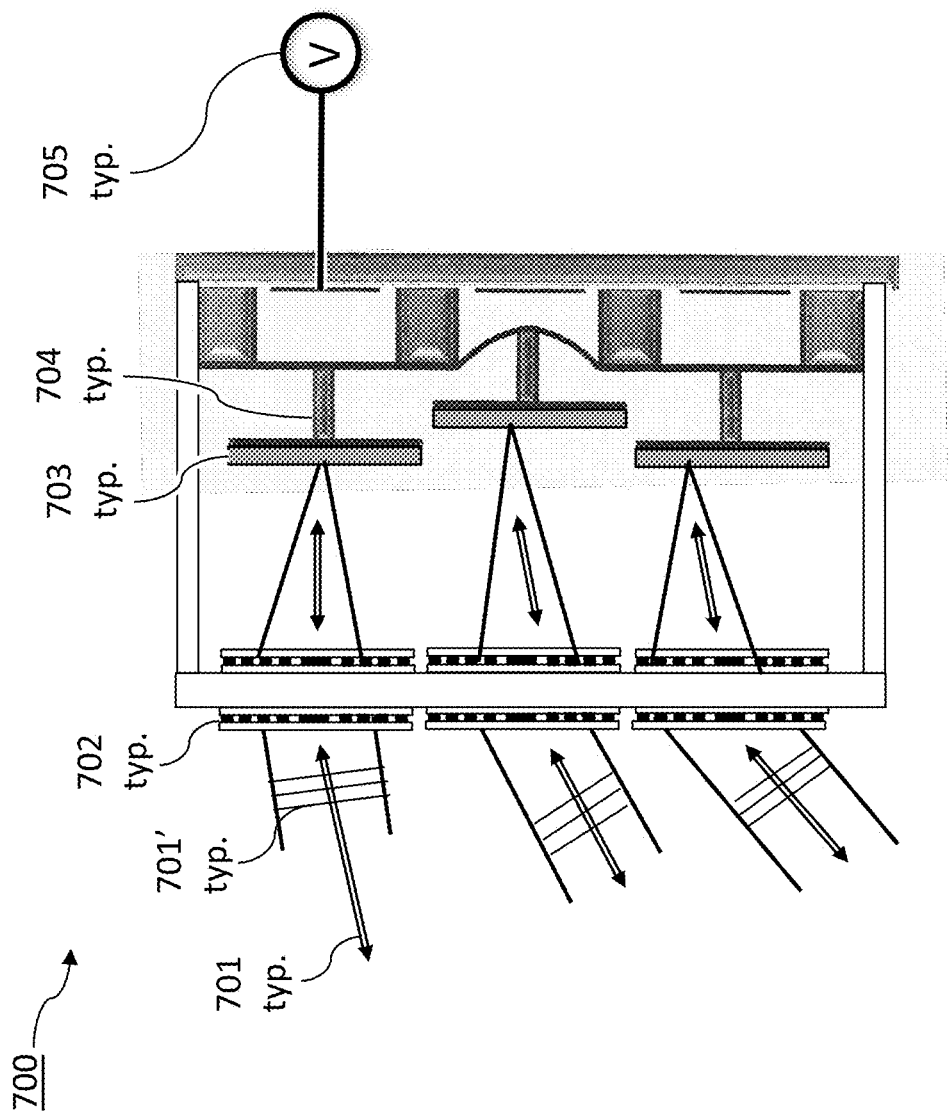
FIG. 7 is a drawing of the MEMS spatial phase modulator (SPM), integrated with a passive retro-reflector array, on a pixel-by-pixel basis. This device is the key component in a retro-array phase conjugate mirror of FIG. 8.
Figure 8:
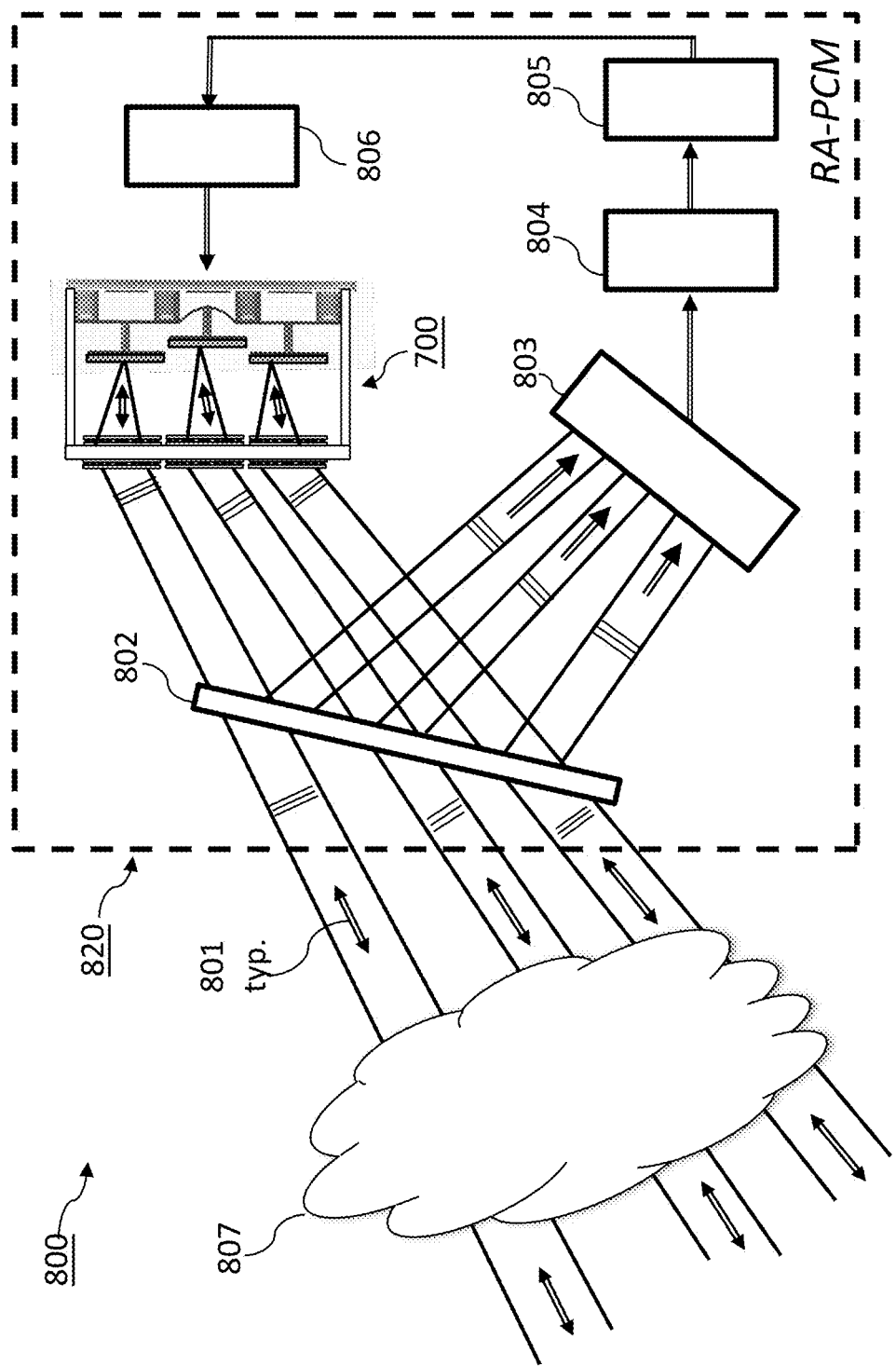
FIG. 8 is a drawing of a retro-array phase conjugate mirror (RA-PCM). A closed loop system controls the phase of each resolvable MEMS piston pixel, whereas a pair of metasurfaces, in conjunction with the reflected light from the MEMS piston elements, form an array cat's eye retroreflector elements, each element of which is integrated with a corresponding SPM phase shifting element, on a pixel-by-pixel basis. The result is that the RA-PCM generates a "true" wavefront reversed replica (a "time-reversed" replica) of an incident optical beam.

FIGS. 7 and 8 show details of a specific PCM in a preferred embodiment of the present disclosure. This specific PCM is referred to as a "retro-array phase-conjugate mirror," RA-PCM. As shown in FIGS. 7 and 8, the key component 700 of the RA-PCM is a MEMS-based spatial phase modulator (SPM), integrated with a cat's eye retroreflector array (a so-called "pseudoconjugator"), on a pixel-by-pixel basis. This composite device has the property of generating a passively retroreflected beam at the speed of light through the device, in the form of a cat's eye retroreflector array, while, concomitantly, controlling the optical phase of the incident wavefront in a closed-loop servo-controlled geometry, also on a pixel-by-pixel basis, via an array of movable, optical phase-shifting MEMS reflective pistons.

Turning now to FIG. 7, a recent prior art example is shown of a MEMS spatial phase modulator (SPM), integrated with a passive retroreflecting array 700. This device forms the key component of the RA-PCM, as shown in FIG. 8 (820), which is utilized in the preferred embodiment of the present disclosure.

Returning to FIG. 7, the basic MEMS devise is comprised of an array of piston (704) driven mirror segments 703, each coated with a thin film of metallization or dielectric. The input port of the device is comprised of a pair of subwavelength metasurfaces, or subwavelength diffractive optical elements, 702. Each pair of subwavelength structures, 702, in conjunction with the respective reflective surface of the mirror element, 703, forms a cat's eye retroreflector, positioned over each MEMS mirror pixel of the device. Each MEMS mirror element, in turn, is longitudinally controlled by placing a voltage (or, magnetic field) across each pixel 705, each of which controls the optical phase of a respective incident tilted beamlet 701, on a pixel-by-pixel basis. It is further assumed that the incident beam is comprised of a piecewise set of tilted plane waves, as illustrated by 701'. The result of this operation is that each beamlet 701 (plane wave element 701') is retroreflected and phase shifted, on a pixel-by-pixel basis.

This combination of functions—a cat's eye retro reflector array, integrated with a spatial phase modulator on a pixel-by-pixel basis—results in a "true" wavefront reversed ("time-reversed" replica) of an incident optical beam, when configured in a closed-loop geometry. This results in a diffraction-limited system upon reverse transit through the network, compensating for static and dynamic phase errors.

A key property of the resultant retro-array phase conjugate mirror (RA-PCM) is that it is "self-starting" relative to other classes of PCMs. Moreover, this class of RA-PCM is broadband in terms of the incident optical spectrum, is passive, and can process depolarized beams (i.e., beams of arbitrary polarization), while preserving its polarization. Hence, this class of PCM is uniquely qualified to serve the embodiment discussed herein.

Other classes of PCMs are not suited for this embodiment, as they can require a high-intensity (stimulated scattering) threshold condition to be met, can result in a wavelength-shifted return (i.e., the incident and phase conjugated beams are not of the same wavelength) and/or can require coherent pump beam(s) to initiate wavefront reversal. These undesirable characteristics are typical of a nonlinear optical PCM; the present RA-PCM is a linear device. The RA-PCM satisfies the spatial, polarization, temporal and spectral bandwidth requirements of the disclosure.

Recall, that the RA-PCM is comprised of a SPM integrated with a retroreflecting array. The presence of an array of retroreflectors enables compensation for odd-order phase errors beyond the lowest odd-order phase error (tilt). (By comparison, a single retroreflector compensates for only tilt errors; the lowest odd-order phase error.) Once initiated, a "bootstrapping" modality is realized as the closed-loop servo system simultaneously configures the multi-pixel, phase-shifting array of the spatial phase modulator (SPM) of the RA-PCM in the presence of the passive retroreflector array. That is, the passive retroreflector array functions at the speed of light through the system, concomitant with the SPM, the latter thereby forming a closed-loop, servo-controlled compensation system for piston errors of the incident beam, driving the remaining phase errors (even-order phase errors, etc.) to near-zero.

Turning now to FIG. 8, details of the RA-PCM are shown 800. The basic RA-PCM 820 is comprised of a spatial phase modulator (SPM) integrated with a retroreflecting array, 700, configured in an adaptive optical control (feedback) servo loop. As is known in the art, the basic servo loop is comprised of a beam splitter 802 that samples the overall beam, a wavefront sensor, WES, 803 (such as a Shack-Hartmann or pyramid wavefront sensor), a data processor module 804, a feedback control-law processor 805 and a drive electronics module 806, the latter of which controls the phase shifting pixels (recall 705 in FIG. 7) of the RA-PCM device, comprised of a spatial phase modulator/integrated retroreflector array 700.

Upon convergence of the closed-loop servo, the RA-PCM compensates for phase errors (beam wander, relative platform motion, vibrations, fiber modal dispersion, optical component aberrations, etc.), represented by 807, upon double-passing (i.e., reverse transit) through the system 801. The result of this combined operation is that the incident beam is perfectly wavefront-inverted (limited by the gain and resolution of the system, as is known in the art), resulting in a true wavefront reversed replica (or, "time-reversed" replica) of the incident wave. This operation optimizes the performance of the pulse shaping network in terms of temporal resolution of the desired output waveform.

Figure 9:
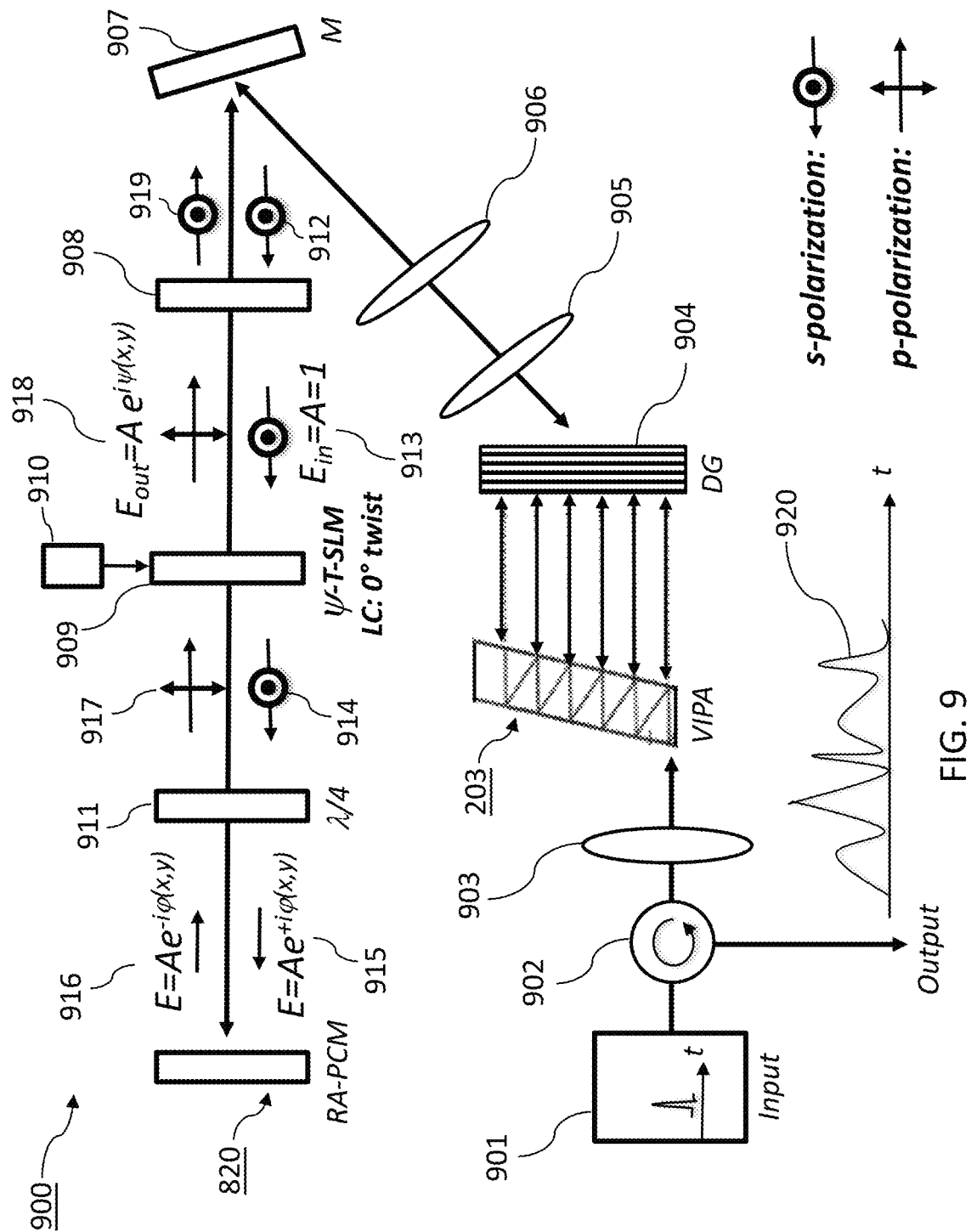
FIG. 9 is a drawing of an exemplary embodiment of the disclosure, depicting a two-dimensional VIPA-grating pair pulse shaping network using a retro-array phase conjugate mirror to compensate for path distortions, and misalignment, resulting in a diffraction-limited system. In this embodiment, a phase-only transmissive spatial light modulator ($\psi$-T-SLM) is employed as a programmable birefringent phase mask. In this configuration, a $\lambda/4$ waveplate is inserted between the $\psi$-T-SLM and the RA-PCM. In this geometry, only the reverse propagating phase-conjugate beam is spatially encoded with the $\psi$-T-SLM 2-d phase mask information [$\psi(x,y)$], whereas the forward-going beam is not. On the other hand, the RA-PCM samples the accumulated system phase distortions [$\varphi(x,y)$], and, upon reverse transit through the overall system, compensates for the phase distortions, resulting in a diffraction-limited pulse shaping network output. A Faraday rotator ensures that the incident beam is s-polarized parallel to the ordinary axis of the $\psi$-T-SLM and that the output beam is of the same s-polarization as that of the incident beam.

Turning now to FIG. 9, a preferred embodiment of the disclosure is shown 900. The key components of the pulse shaper are comprised of a VIPA-diffraction grating pair, a phase-only transmissive spatial light modulator (ψ-T-SLM) and a retro-array phase conjugate mirror (RA-PCM). A Faraday rotator/polarizer is employed to assure that the incident and reverse transit light are both s-polarized. In this embodiment, the spatial light modulator forms a 2-d programmable phase mask of tunable birefringence, on a pixel-by-pixel basis, for the pulse shaping network.

In this preferred embodiment, the polarization of the system is specified so that the phase mask information is only imposed on the p-polarized (phase-conjugated), reverse-transit light; and not on the s-polarized (incident) light. The justification for this design will become apparent below.

In the phase-only transmissive mode, the liquid crystal (LC) layer of the ψ-T-SLM is configured so that the LC director molecules are aligned parallel throughout the thickness of the layer. In FIG. 9, the LC layer is aligned in the plane of the drawing and is parallel to the LC windows (so-called 0° twist). In this alignment, the LC layer emulates a tunable birefringence layer (ranging from $n_e$ to $n_o$) with respect to p-polarized light (polarized parallel to the extraordinary axis); and, a fixed index layer (of index, $n_o$) with respect to the incident s-polarized light (polarized parallel to the [orthogonal] ordinary axis).

As a voltage is applied by the SLM across the layer (on a pixel-by-pixel basis), the LC molecules all tilt in the same direction (in the plane of the drawing), thereby changing the effective birefringence from its maximum value of $n_e-n_o$, to zero ($n_e=n_o$), where $n_e$ is the extraordinary refractive index of the LC layer and $n_o$ is the ordinary index of the LC layer. At the maximum voltage, all the LC molecules are aligned perpendicular to the LC windows. Hence, light polarized parallel to the extraordinary axis (p-polarized) will experience a tunable index (from $n_o$ to $n_o$), or a tunable phase shift ($\psi=2\pi$ Ln/$\lambda$, where L is the thickness of the LC layer and n is the effective refractive index of the layer), on a pixel-by-pixel basis, as a function of SLM activation (the "phase mask" information). On the other hand, light polarized perpendicular to the extraordinary axis, known in the art as the ordinary axis (s-polarized), will experience the same ordinary index ($n_o$) over the $\psi$-T-SLM activation voltage range and remain unchanged.

The system is configured so that light propagating toward the $\psi$-T-SLM from the VIPA-grating pair (203-913) is s-polarized so that it is aligned perpendicular to the LC director axis. Hence its index of refraction is independent of the tuning of the LC layer for the forward-going light; it experiences only an ordinary index as the LC birefringence is tuned. This light is s-polarized. Hence, as the $\psi$-T-SLM is tuned, no phase mask information is imposed on this forward-going beam.

On the other hand, the phase conjugated, backward-going light is adjusted to be p-polarized so that it is aligned parallel to the director axis (i.e., it is p-polarized parallel to the extraordinary axis) as it enters the LC layer on its reverse transit 917. Hence, as the $\psi$-T-SLM is tuned, the reverse-propagating light experiences the tunable birefringence of the layer. That is, the phase conjugated light 917 is p-polarized. Therefore, as the SLM is tuned, desired 2-d phase mask information is imposed on this backward-going beam, on a pixel-by-pixel basis. The polarization change from s-polarization to p-polarization is accomplished by the light double-passing $\lambda$/4 plate 911, positioned between the $\psi$-T-SLM 909 and the RA-PCM 820 and conjugation by the RA-PCM. Note that this class of PCM (the RA-PCM) preserves the incident polarization over the bandwidth of the system, which is desired.

The reason for this configuration is such that the phase conjugated light only inverts the phase errors [$\varphi(x,y)$] accumulated by distortions in the system from 915 ($E=A\,e^{-i\varphi(x,y)}$) to 916 ($E=Ae^{-i\varphi(x,y)}$) and does not invert the phase [$\psi(x,y)$] of the phase-only mask of the LC layer (otherwise, the phase conjugation process would "undo" the desired phase mask information).

Figure 1A:
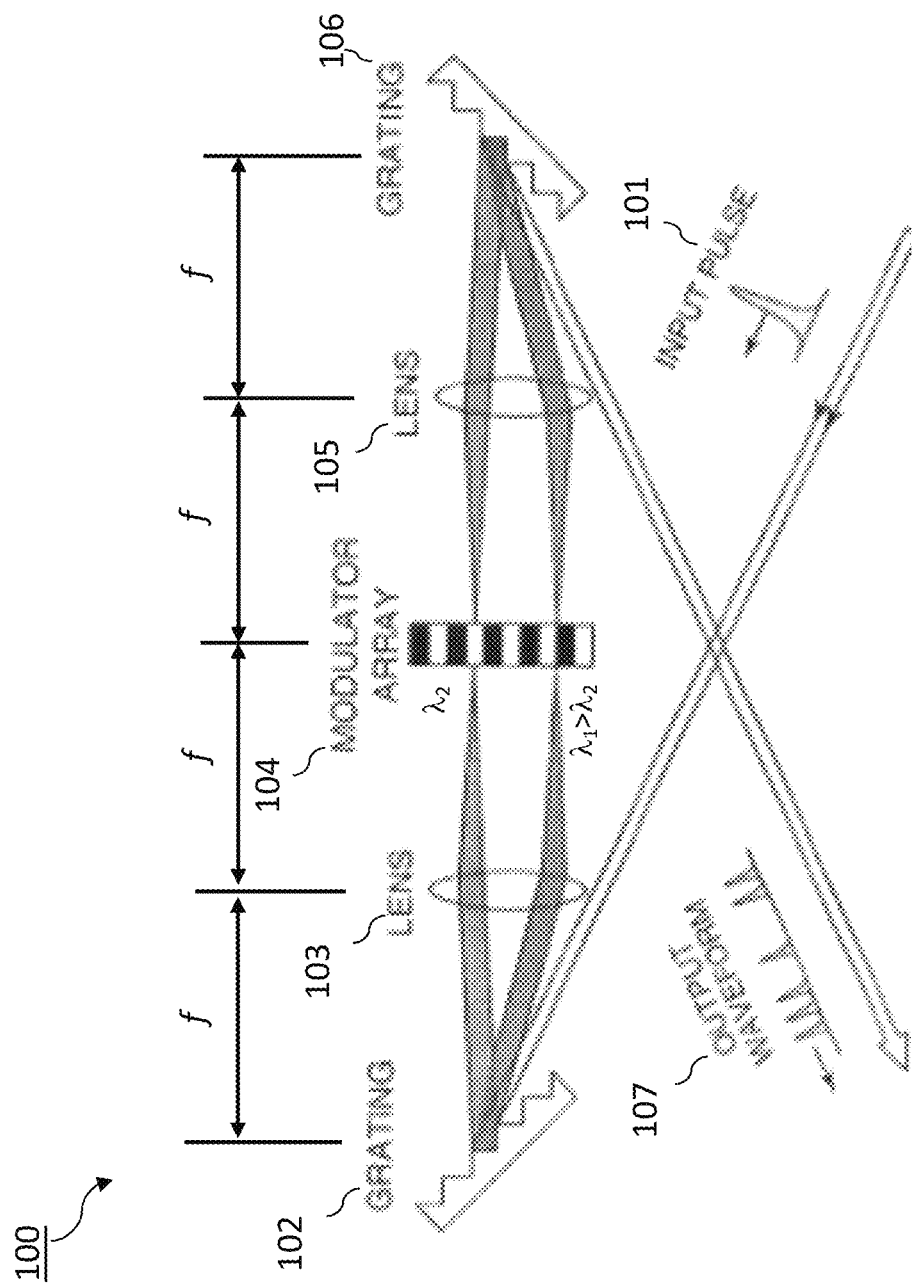
FIG. 1A shows a prior art, one-dimensional pulse shaping network using a pair of dispersive elements (two gratings), a pair of Fourier transform lenses and a 1-d linear spatial modulator array, arranged in a "4-f" transmission configuration.
Figure 1B:
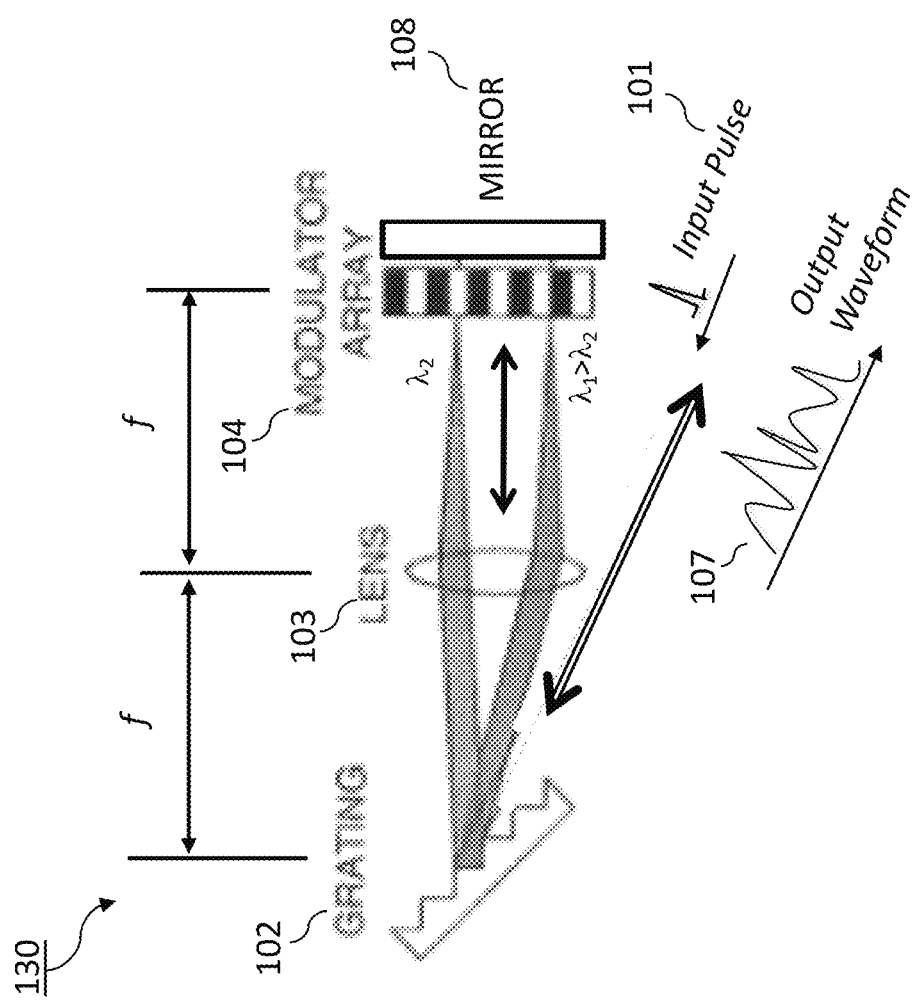
FIG. 1B shows a prior art, one-dimensional pulse shaping network using a single dispersive element (a grating), a single lens and a 1-d linear spatial modulator array, arranged in a double-pass, folded configuration.
Figure 1C:
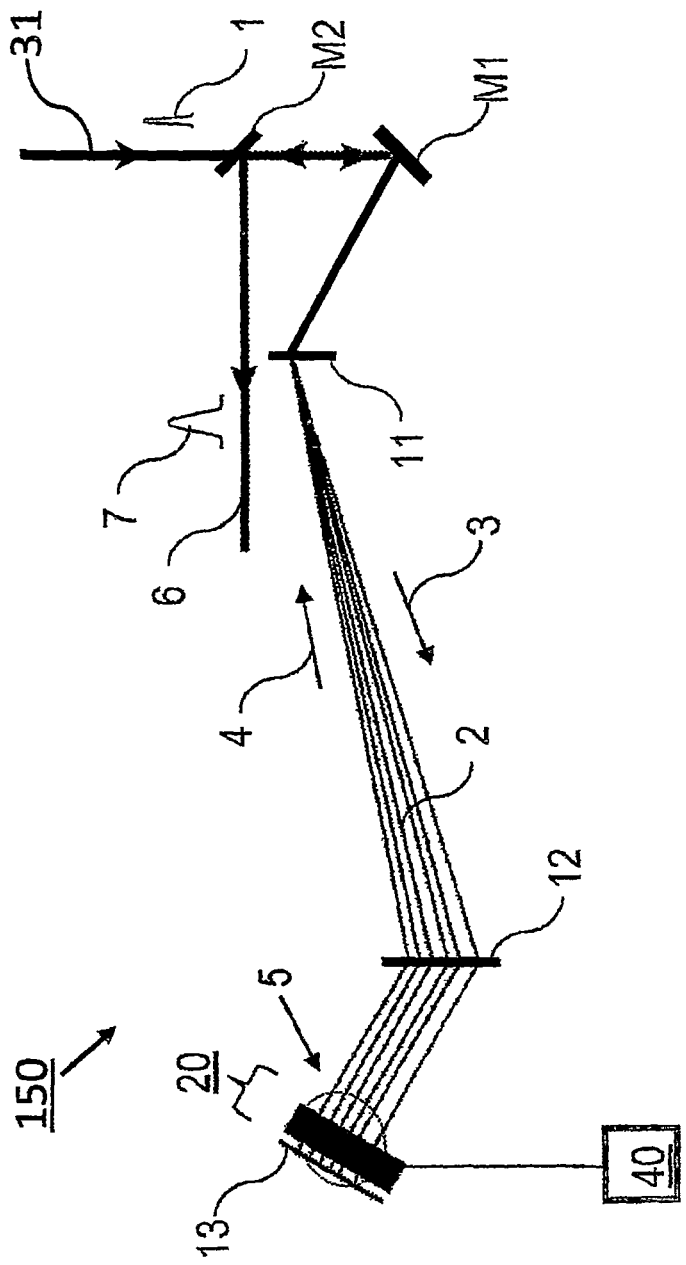
FIG. 1C shows a prior art, one-dimensional pulse shaping network using a pair of dispersive elements (two gratings), and a 1-d linear spatial modulator array, arranged in a double-pass, folded configuration, where one of the gratings effectively replaces a lens of the previous configuration (FIG. 1B).
Figure 2A:
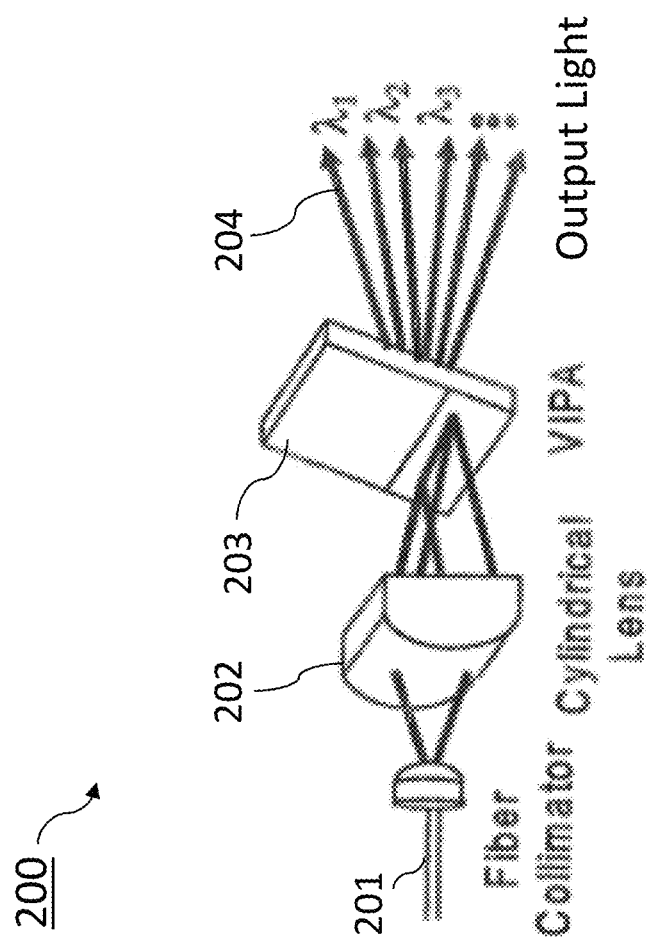
FIG. 2A shows a prior art, virtually imaged phase array (VIPA), depicting the ability of the element to dispersive a single transmissive order into its spectral components (i.e., a set of wavelengths).
Figure 2B:
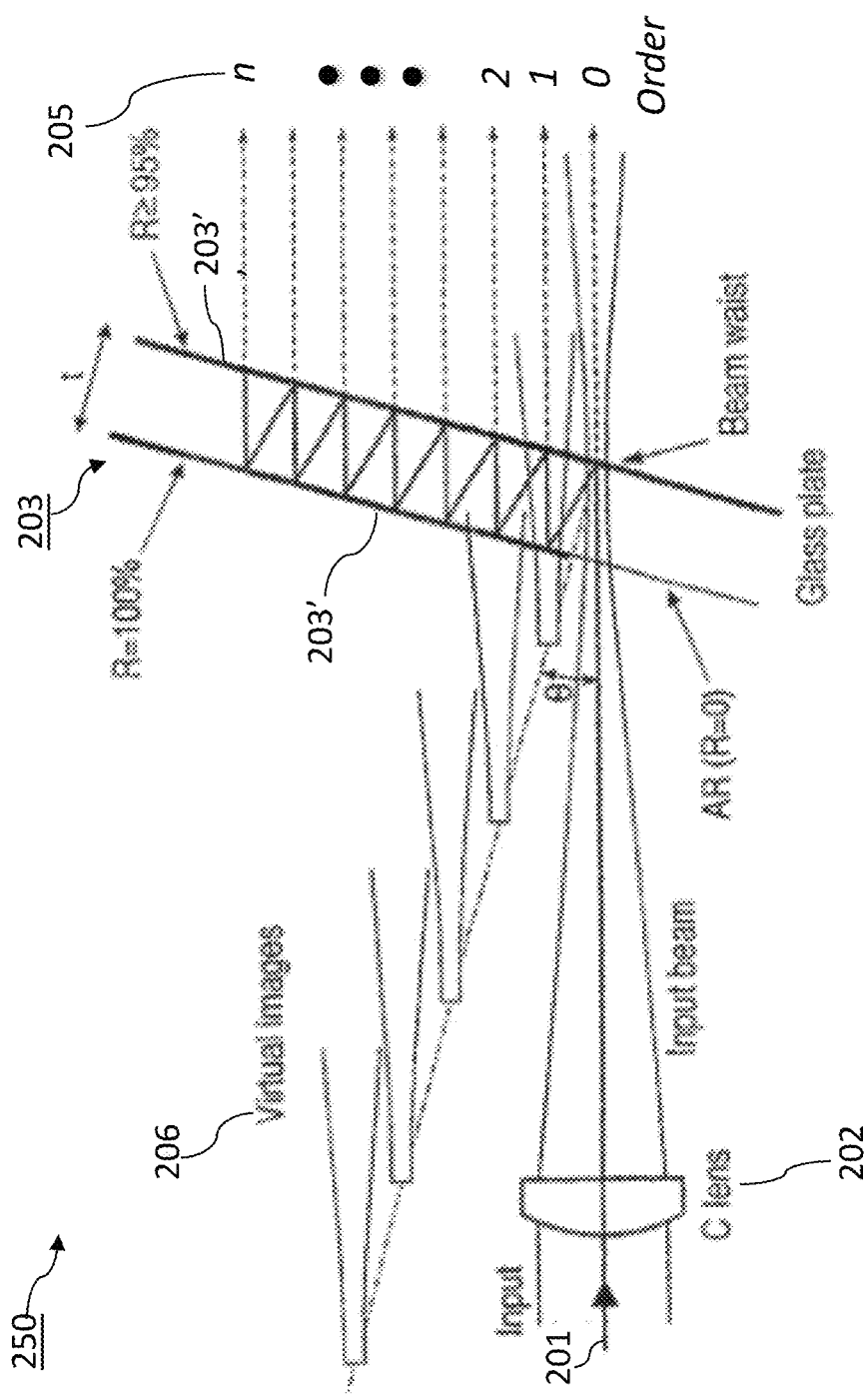
FIG. 2B shows a prior art, virtually imaged phase array (VIPA), depicting details of its construction and its ability to generate a set of transmissive orders that coherently combine from a set of virtual images. Each order is spectrally dispersed into a set of wavelengths (not shown).
Figure 3:
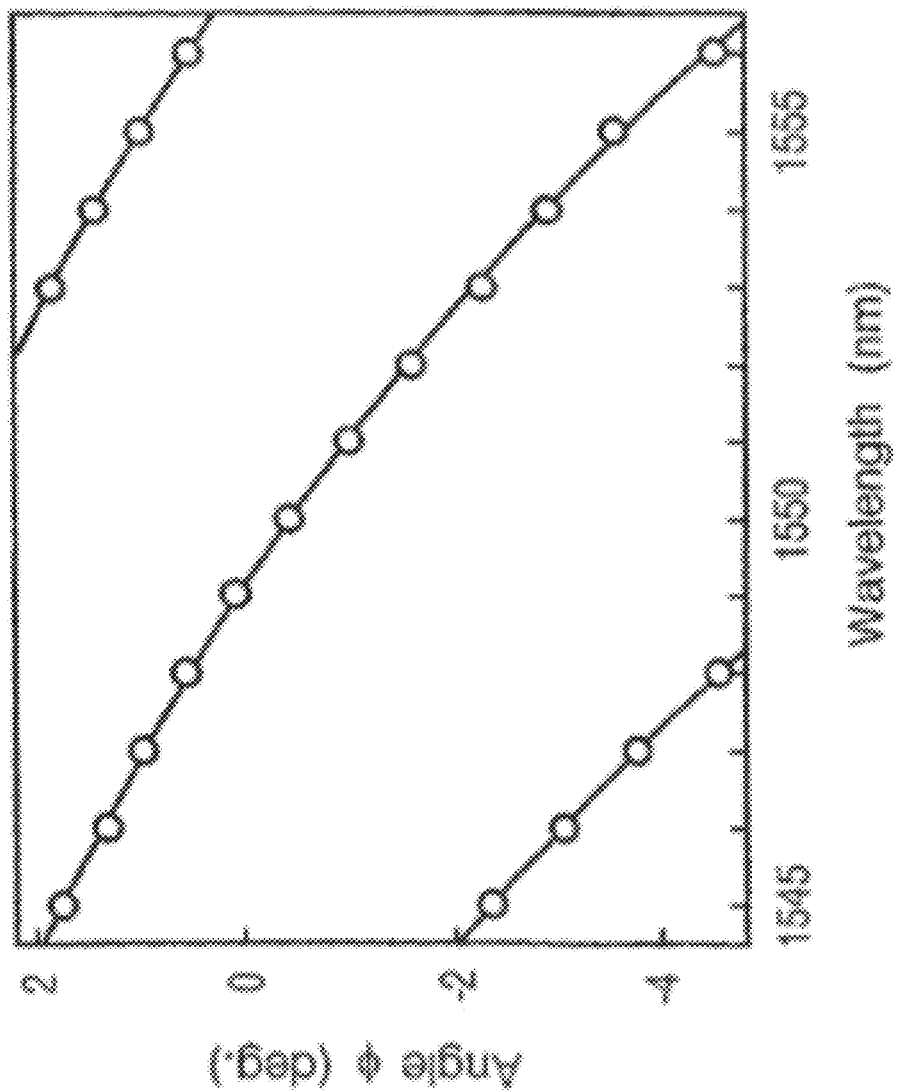
FIG. 3 shows results of the measured angular dispersion (angle vs. wavelength) of various orders for a typical VIPA element. This dispersion is an order of magnitude greater than that of a typical diffraction grating.
Figure 4:
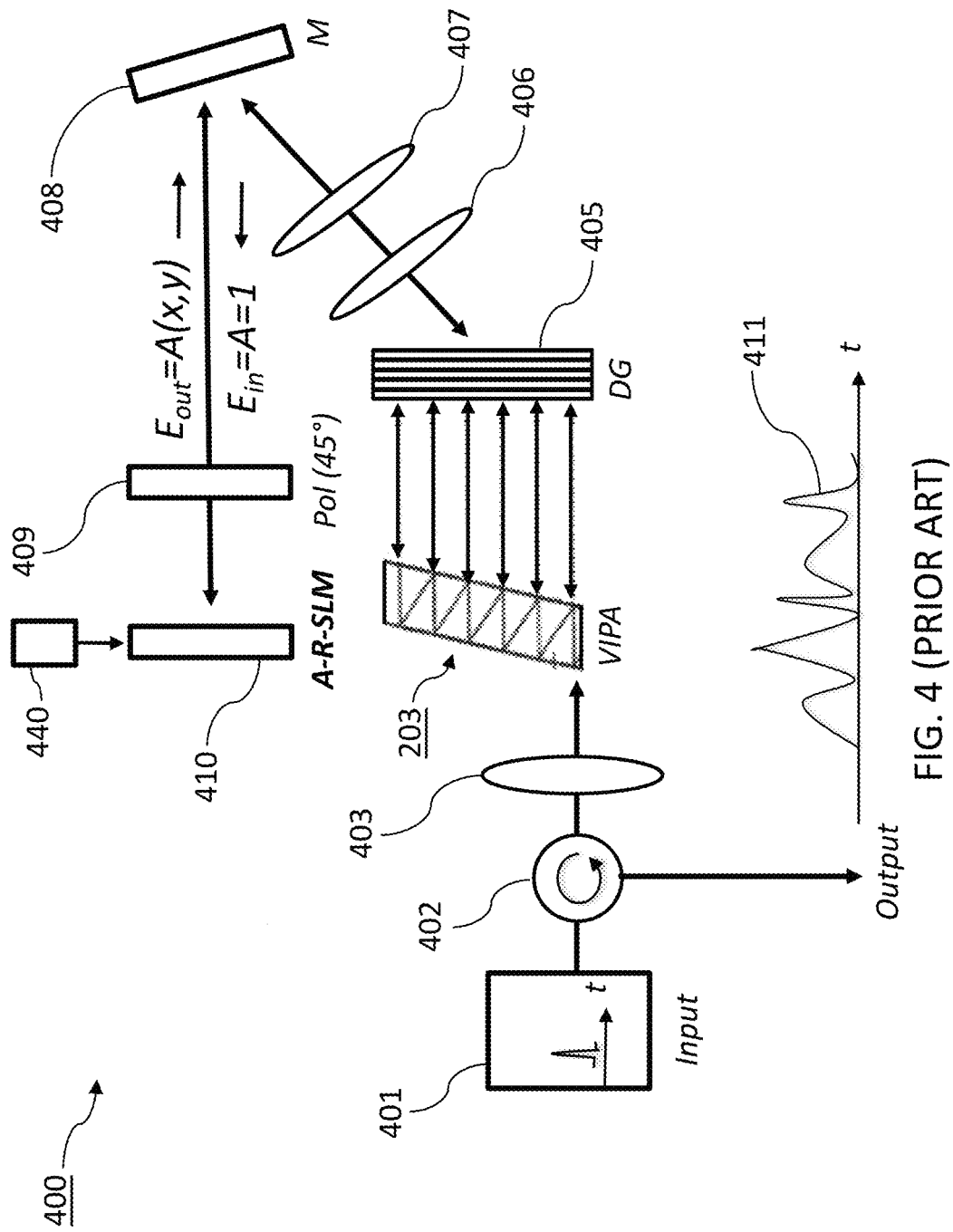
FIG. 4 shows a prior art, two-dimensional pulse shaping network using a VIPA as a dispersive element, a diffraction grating oriented orthogonal to the VIPA and a 2-d amplitude reflective spatial light modulator (A-R-SLM), arranged in a double-pass, folded configuration.
Figure 5:
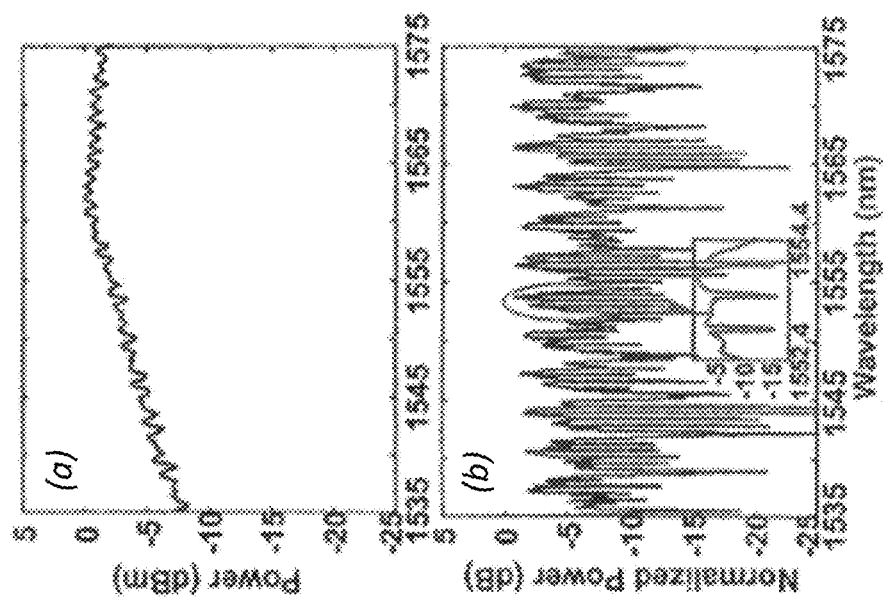
FIG. 5 shows results of the performance of the configuration shown in FIG. 4.
Figure 6:
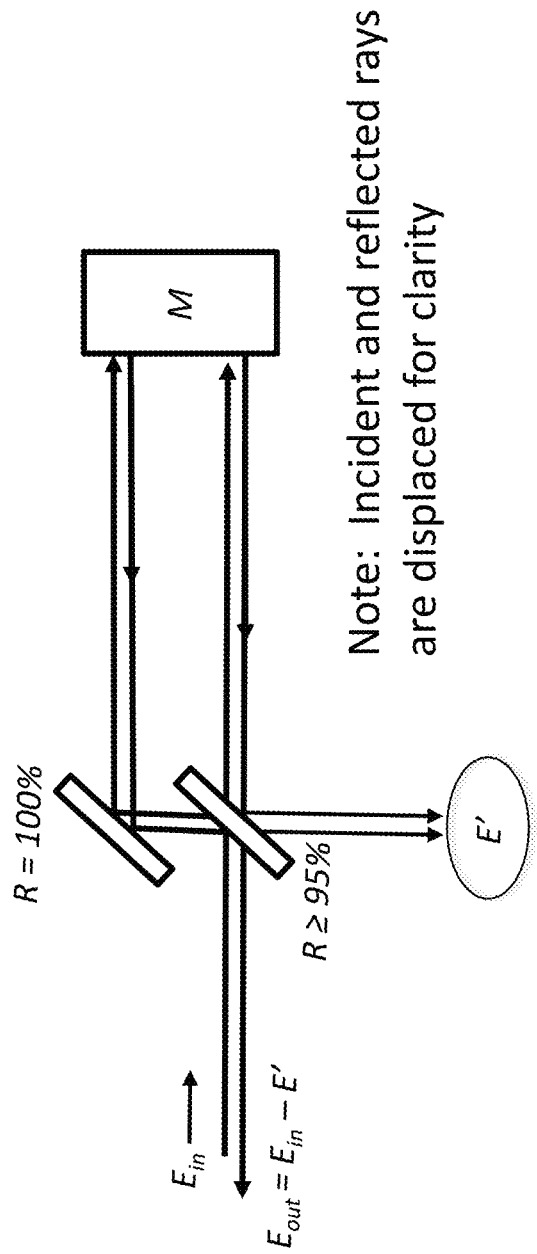
FIG. 6 depicts a Mach-Zehnder interferometer with a reflected element to double-pass the interferometer, emulating a pair of VIPA output orders. Shown is comparison of the system using a conventional mirror (FIG. 6A) with that using a phase-conjugate mirror (FIG. 6B). In the former case, an undesirable coherent output is noted (E'>0), resulting in a reduced retro-returned beam ($E_{out}=E_{in}-E'<E_{in}$). In the latter case, the interferometer beams are retro-returned to the interferometer with an inverted optical phase relative to the initial pair of beams, resulting in a 100% retro-returned coherent beam ($E_{out}=E_{in}$; E'=0) and diffraction-limited performance, concomitantly compensating for phase errors, distortions, beam wander, vibrations and aberrations in the interferometer and other optical elements. Moreover, the set of the retro-returned beams match the wavefronts of the respective, set of displaced virtual images of the forward-going beams.

In other words, the forward-going light is not encoded with the phase mask information but does experience the system phase distortions 915, whereas the phase conjugated light 916 is encoded with the desired phase-mask information, resulting on output beam 918 ($E_{out}=Ae^{-i\varphi(x,y)}$). Since the phase conjugated light has its wavefront inverted (due to the accumulated phase distortion) 916, the undesirable phase distortions are "undone" on the reverse-sequence transit through the system, including that of the $\psi$-T-SLM, and including those due to the VIPA-grating pair, etc., as described above with respect to FIG. 6. On the other hand, the reverse-propagating light is encoded with the desired phase-mask information [$\psi(x,y)$] of the $\psi$-T-SLM.

This scheme exploits the fact that all the elements in the pulse shaping network (the $\psi$-T-SLM, VIPA, grating, lenses, RA-PCM.) do not affect the polarization of the light on either pass (i.e., the polarization is maintained), other than the $\lambda$/4 plate and the Faraday rotator, both of which rotates the polarization by 90° upon double-passage, which is desired.

Returning to FIG. 9, collimated light from a short-pulse source 901 is incident upon a circulator 902 and is subsequently line-focused upon a VIPA 203 by a cylindrical lens 903, producing a line focus at the input port of the VIPA module. The multiple-order output of the VIPA 203 is then incident upon a diffraction grating 904, oriented orthogonally with respect to the VIPA. The beam that diffracts from the grating is then incident upon a pair of orthogonally oriented cylindrical lenses, 905 and 906, the former lens collimating the light output from the VIPA and the latter lens collimating the light from the diffraction grating. The light then reflects from mirror 907, and, is subsequently incident 912 upon a Faraday rotator/polarizer pair 908, which assures that the incident and return beams are both s-polarized. This is followed by a phase-only, transmission-mode, spatial light modulator ($\psi$-T-SLM) 909, which is programmed by controller 910. The $\psi$-T-SLM is positioned at the back focal planes of lenses 906 and 907.

As described above, the $\psi$-T-SLM is configured so that the liquid crystal (LC) director is aligned parallel to the front and back windows of the structure (0° twist of the LC layer). In this orientation, as the $\psi$-T-SLM is activated, the birefringence varies from its maximum value to zero (the birefringence is a function of the difference of the extraordinary, $n_e$, and ordinary, $n_o$, refractive indices of the LC layer). The incident beam 913 ($E_{in}=A=1$), which is featureless, is directed to the SLM, and is s-polarized so that its polarization is oriented parallel to the ordinary refractive index axis of the liquid crystal layer. Hence, the phase mask information of the SLM 909 is not imposed upon the incident (forward-propagating) beam 913 upon passage 914 through the SLM.

The forward-propagating s-polarized beam 914 then propagates through the $\lambda$/4 plate 911. This beam 915 now contains all the accumulated phase distortions of the system ($E=Ae^{-i\varphi(x,y)}$), as it is incident upon the RA-PCM 820. Upon conjugation, the wavefront-reverse-propagating beam 916 has its phase errors inverted ($E=Ae^{-i\varphi(x,y)}$). After reverse passage through the $\lambda$/4 plate 911, the polarization of the beam 917 is now rotated by 90°, and the beam is p-polarized as it propagates in the reverse direction. This beam then propagates back through the $\psi$-T-SLM and now has the phase mask information imposed onto it by the SLM, emerging as beam 918 ($E_{out}Ae^{-i\varphi(x,y)}$). In this configuration, the RA-PCM only "sees" the undesirable phase aberrations due to the optical elements in the system, $\varphi(x,y)$ and not the phase map imposed by the SLM, $\psi(x,y)$. Thus, the action of the RA-PCM only "undoes" the undesirable phase aberrations [$\varphi(x,y)$] and not the desired phase mask information imposed by the SLM onto the beam [$\psi(x,y)$]. This scheme and configuration are not obvious to those skilled in the art.

Recall that the forward-going beam 915 exiting the $\psi$-T-SLM and the $\lambda$/4 plate contains a spatial phase factor, $e^{+i\varphi(x,y)}$, where $\varphi(x,y)$ is the total accumulated undesirable phase distortions due to all the optical elements, as well as the SLM in the system. This aberrated beam is then incident upon the retro-array phase conjugate mirror (RA-PCM) 820, which generates a wavefront-reversed replica of the incident wavefront 916 ($E=Ae^{-i\varphi(x,y)}$). Upon reverse transit back through the system the polarization is rotated by 90° upon double-passing through the $\lambda$/4 plate 911. The resultant wavefront-reversed replica 917 is now p-polarized and possesses an inverted phase factor, $e^{-i\varphi(x,y)}$. This backward-propagating beam then experiences (by reciprocity) a total phase error $e^{+i\varphi(x,y)}$ upon reverse-transit through the entire system, so that the net phase factor due to the distortions, upon exiting the pulse shaper 920, is now $[e^{+i\varphi(x,y)}] \times [e^{-i\varphi(x,y)}] = 1$. That is, the phase distortions are compensated by the RA-PCM upon reverse transit through the pulse shaping system.

On the other hand, the beam, upon reverse transit through the ψ-T-SLM now has the phase mask information imposed, given by $Ae^{+i\varphi(x,y)}$ since the beam is p-polarized 917 prior to entering the SLM in the backward direction and exiting the SLM 918. The beam subsequently double-passes back through the Faraday rotator/polarizer pair 908, has its s-polarization restored 919 relative to that of the incident beam 912, followed by reverse transit (i.e., reverse sequence) back through the lenses (906, 905), the diffraction grating (904) the VIPA (203), the cylindrical lens 903 and, finally, is outcoupled by the circulator 902.

The VIPA-grating pair subsequently transforms the spectral/spatial encoded beam back to the time domain. Hence, the final output beam that emerges from the pulse shaper possesses the desired pulse waveform 920, as programmed by the ψ-T-SLM, is aberration-free and is diffraction-limited, providing the maximum temporal resolution—limited by the number of pixels on the ψ-T-SLM, the dispersion of the VIPA-grating pair, and the diffraction limit of the optical system.

This embodiment is not obvious to one skilled in the art, as the RA-PCM is self-starting, threshold-free, functions in the face of depolarized light (i.e., it preserves that polarization of the phase-conjugated light), is broad-spectral band, compensates for phase errors throughout the system, including constructive (desirable) interference of the VIPA orders upon reverse transit of the system and is diffraction-limited. Moreover, given the tunable birefringence of the LC layer and the specification of the polarization of the beams, the phase mask information is only applied after the beam is phase-conjugated (and, not prior to the beam incident upon the RA-PCM). Hence, the desired 2-d phase mask information $[\psi(x,y)]$ is imposed on the beam as it propagates in reverse-sequence back through the diffraction grating-VIPA pair and not as it propagates in the forward direction. The system compensates for undesirable phase distortions $[\varphi(x,y)]$, resulting in a diffraction-limited pulse shaper network output, 920, with optimal temporal resolution of the incident spectral bandwidth.

The foregoing description of the disclosure has been presented for purposes of illustration and description and is not intended to be exhaustive or to limit the disclosure to the precise form disclosed. Many modifications and variations are possible in light of the above teaching. The embodiments disclosed were meant only to explain the principles of the disclosure and its practical application to thereby enable others skilled in the art to best use the disclosure in various embodiments and with various modifications suited to the particular use contemplated.

As an example, various other dispersive elements beyond VIPAs and gratings, as well as SLMs, can be implemented in the pulse shaper, such as dispersive metasurfaces, metaoptical elements, arrayed-waveguide gratings (AWGs), cascaded Bragg gratings, acousto-optic modulators, etc. as well as multi-pixel metamaterial-based programmable SLMs. In this case, the RA-PCM compensates for the dispersive element distortions as well as for metamaterial aberrations. Thus, the system is not limited to VIPA and grating dispersive elements. Hence, a pair of elements chosen from a combination of metamaterial elements, AWGs, etc. can be employed in the 2-d pulse shaping network disclosed herein to advantage.

In addition, systems that employ multiple parallel beams for simultaneous pulse shaping can be implemented into the phase-conjugate system, since the use of an RA-PCM provides for constructive interference of the combined beams (i.e., the phase differences of the various beams are compensated by the conjugator), thereby enhancing the performance of the system.

Guided-wave pulse shaping networks can also be implemented using the RA-PCM for efficient waveguide coupling and modal dispersion compensation. Moreover, RA-PCMs using metamaterials for phase shifting control of optical beams can also be implemented using the teachings presented herein.

Optical phase shifters such as tunable metasurface elements, single-mode and multi-mode waveguide phase shifters can be utilized, as well as metasurface and MEMS SLM optical phase shifting arrays and other photonic devices, in place of conventional electro-optical and mechanical phase shifters (e.g., electro-optical crystals, liquid crystals, PZT-wound fiber phase shifters, etc.).

It is also understood that the teachings herein can apply to guided-wave implementations of the present disclosure, given the state-of-the-art in optical fiber devices including, but not limited to, modulators, Faraday rotators and isolators, polarizers, sensors, fiber couplers and splitters, photonic crystal fibers, holey fibers, diode-pumped fiber lasers, amplifiers, Raman fiber amplifiers and MEMS devices. Fiber realizations can also be employed in place of bulk optical elements.

Furthermore, it is also to be understood that the teachings described herein can also apply to systems that operate in other regions of the electro-magnetic spectrum, from mm waves to the ultraviolet and beyond. As an example, precision compensated imaging over propagation-path distortions in the THz regime can be realized by employing appropriate THz detectors, sources, and beam forming components (THz sensors, imagers, diffraction gratings, photonic crystals, modulators, etc.) analogous to those in the optical embodiments. In addition, it is to be appreciated that the extension of the techniques taught herein can also apply to acoustic and ultrasonic beam pulse forming systems through acoustic-based distortion paths.

The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the disclosure be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

The foregoing Detailed Description of exemplary and preferred embodiments is presented for purposes of illustration and disclosure in accordance with the requirements of the law. It is not intended to be exhaustive nor to limit the disclosure to the precise form(s) described, but only to enable others skilled in the art to understand how the disclosure may be suited for a particular use or implementation.

The scope of the disclosure is to be defined by the following claims.

What is claimed is:

1. A system for programmably adjusting the phase of the frequency components of an optical signal of a specific linear polarization, comprising:
   a circulator to receive and transmit the incident optical signal and to outcouple the reverse propagating optical signal;
   a first cylindrical lens to receive said optical signal beyond the circulator and to focus the optical signal into a line focus;
   a first dispersive module to receive and to disperse the said line-focused optical signal into its frequency components;
   a second dispersive module oriented orthogonally with respect to said first dispersive module to receive and to further disperse the said dispersed optical signal in an orthogonal direction;
   a second cylindrical lens arranged one focal length beyond the first dispersive element to receive and to collimate the said first dispersed optical signal;
   a third cylindrical lens oriented orthogonally with respect to said second cylindrical lens and arranged one focal length beyond the second dispersive element to receive and to collimate the said second dispersed optical signal;
   a polarization dependent spatial light modulator (SLM) having an active area comprising a plurality of independently addressable regions, the SLM arranged to receive the frequency components on the active area, said SLM arranged at the common back Fourier plane of the said second and said third cylindrical lenses, wherein the said SLM is capable of modulating the phase of the spectral components of the said laser pulses upon reverse propagation of said laser pulses;
   a controller coupled to the SLM wherein during operation the controller causes the SLM to adjust the phase of one or more of the frequency components of the said signal;
   a phase conjugate mirror (PCM) arranged to receive the said phase adjusted signal beyond the SLM and to generate a wavefront-reversed replica of the received signal, wherein said wavefront-reversed replica traverses the said optical components in reverse sequence, and wherein said circulator outcouples the said reverse-sequence beam;
   a linear polarizer and a Faraday rotator arranged between said third cylindrical lens and said SLM; and
   a quarter-wave plate arranged between said SLM and said PCM.

2. The optical system according to claim 1, wherein the said SLM is operated by the said controller to alter the chromatic dispersion of the said signal.

3. The optical system according to claim 1, wherein the said SLM includes a single liquid crystal (LC) layer to adjust the phase of said light passing in reverse sequence therethrough.

4. The optical system according to claim 1, wherein the said LC layer is configured at maintain the polarization of said incident beam.

5. The optical system according to claim 1, wherein the said LC layer is configured to emulate a tunable birefringent element.

6. The optical system according to claim 1, wherein said SLM is a transmission SLM.

7. The optical system according to claim 1, wherein the polarization of the said signal incident upon said birefringent LC layer of said SLM is adjusted to align parallel to ordinary axis of said birefringent LC layer.

8. The optical system according to claim 1, wherein the phase fronts of the said signal incident upon passage through said birefringent layer of said SLM maintains its wavefront upon activation of said birefringent LC layer by said SLM.

9. The optical system according to claim 1, wherein said signal, upon propagation through said quarter-wave plate and reflection from said RA-PCM has its polarization rotated by 90° after double-passing the said quarter-wave plate therethrough.

10. The optical system according to claim 1, wherein said signal upon double-passing through said quarter-wave plate has its polarization aligned parallel to the extraordinary axis of said birefringent LC layer of said SLM.

11. The optical system according to claim 1, wherein the reverse propagating signal has its phase modified on a pixel-by-pixel basis by said SLM.

12. The optical system according to claim 1, wherein said PCM is a retro-array phase conjugate mirror (RA-PCM) and generates a wavefront reversed replica of said incident signal.

13. The RA-PCM according to claim 12, wherein the RA-PCM maintains the polarization of the said incident signal upon generation of said wavefront reversed signal.

14. The optical system according to claim 12, wherein the said phase-conjugate mirror is comprised of a retroreflecting array for wavefront reversal, integrated with a spatial phase modulator (SPM), on a pixel-by-pixel basis, said spatial light modulator comprised of an array of MEMS continuously moveable planar piston segments that simultaneously imparts a controllable, continuous phase shift onto said respective incident optical beams.

15. The optical system according to claim 12, wherein the said SPM is configured in a closed-loop, servo-controlled adaptive optical system for efficient wavefront reversal of said respective incident optical beam, simultaneous with said retroreflecting array.

16. The optical system according to claim 1, wherein the first dispersive module includes one of a diffraction grating, a chromatic prism, an arrayed waveguide, a cascaded Bragg grating, and a virtually imaged phased array, and, wherein second dispersive module includes one of a diffraction grating, a chromatic prism, an arrayed waveguide, a cascaded Bragg grating, and a virtually imaged phased array.

17. The optical system according to claim 1, wherein said optical signal is a multiplexed optical signal comprising different channel optical signals centered around different wavelengths, and wherein the active area of said SLM is divided up into sets of addressable regions corresponding to frequency components of the different said channel optical signals.

* * * * *